United States Patent [19]
Azuma et al.

[11] Patent Number: 5,179,158
[45] Date of Patent: Jan. 12, 1993

[54] PROCESS FOR PRODUCING AQUEOUS RESIN DISPERSION

[75] Inventors: Kishiro Azuma; Yoshio Mori, both of Aichi; Masayoshi Okubo, Hyogo, all of Japan

[73] Assignee: Toagosei Chemical Industry Co., Ltd., Tokyo, Japan

[21] Appl. No.: 564,479

[22] Filed: Aug. 9, 1990

[30] Foreign Application Priority Data

Aug. 9, 1989 [JP] Japan .................. 1-206537
Dec. 21, 1989 [JP] Japan .................. 1-331800

[51] Int. Cl.$^5$ .............................................. C08J 5/01
[52] U.S. Cl. ................................. 524/748; 524/745; 526/214; 526/222; 526/225
[58] Field of Search ............. 526/225, 222, 214; 524/745, 748

[56] References Cited

U.S. PATENT DOCUMENTS

| | | | |
|---|---|---|---|
| 3,329,640 | 7/1967 | Scotti et al. | 524/748 |
| 3,759,859 | 9/1973 | Steinwand | 526/225 |
| 3,842,059 | 10/1974 | Milkovich et al. | 525/386 |
| 3,862,077 | 1/1975 | Schulz et al. | 524/417 |
| 4,299,975 | 11/1981 | Asbeck et al. | 526/214 |

OTHER PUBLICATIONS

J. P. Kennedy et al., "Macromers by Carbocationic Polymerization", *Polymer Bulletin* 13, pp. 441–446, 1985.

*Primary Examiner*—Paul R. Michl
*Assistant Examiner*—Patrick Niland
*Attorney, Agent, or Firm*—Sughrue, Mion, Zinn, Macpeak & Seas

[57] ABSTRACT

A process for producing an aqueous resin dispersion is disclosed, which comprises dissolving a macromonomer having a radical polymerizable group at the terminal thereof and an oil-soluble radical polymerization initiator in a hydrophobic vinyl monomer copolymerizable with the macromonomer to form a solution, emulsifying the solution in an aqueous medium in the presence of an emulsifying agent selected from (A) an alkali sulfosuccinate anionic surfactant and (B) a surfactant comprising from 2 to 98% by weight of (i) an alkali sulfonate anionic surfactant other than (A) or (ii) an alkali sulfuric ester anionic surfactant, and from 98 to 2% by weight of a nonionic surfactant having an HLB value of 10 or more, and copolymerizing the macromonomer and the vinyl monomer at an elevated temperature. The aqueous resin dispersion has a high content of a graft polymer with a reduced content of unreacted macromonomer.

7 Claims, No Drawings

PROCESS FOR PRODUCING AQUEOUS RESIN DISPERSION

FIELD OF THE INVENTION

This invention relates to a process for producing an aqueous resin dispersion by aqueous emulsion polymerization of a radical polymerizable macromonomer and other radical polymerizable monomers. The aqueous resin dispersion obtained by the present invention is an emulsion of microfine resin particles having an average particle diameter of not more than about 1 μm and mainly comprising a graft polymer prepared by a macromonomer process. The aqueous resin dispersion of the present invention is suitable as a coating, an adhesive such as a pressure-sensitive adhesive, etc.

BACKGROUND OF THE INVENTION

Graft polymers have recently been recognized as being useful as highly functional high polymeric materials and have come into wide use in industry.

Graft polymers have conventionally been produced by polymerizing a graft monomer by solution polymerization, bulk polymerization or emulsion polymerization in the presence of a high-molecular weight compound as a main polymer which comprises a monomer different from the graft monomer by using a polymerization initiator, such as a radical polymerization initiator. The graft polymers obtained by these processes have low purity due to the presence of a large proportion of a non-grafted polymer.

In recent years, a process comprising copolymerizing a high-molecular weight monomer having a polymerizable group at the terminal thereof, called a macromonomer, with other copolymerizable monomers (hereinafter referred to as a macromonomer process) has been developed and has attracted attention as a process capable of providing graft polymers at a high grafting efficiency.

The production of graft polymers according to the macromonomer process has generally been carried out by solution polymerization using a solution of a macromonomer and a copolymerizable monomer in an organic solvent by or suspension polymerization using an aqueous suspension of the monomers. However, solution polymerization does not meet present demands for environmental conservation and preservation of resources. On the other hand, since graft polymers obtained by suspension polymerization undergo phase separation into a liquid phase and a solid phase, it is difficult to handle them as an aqueous dispersion in a stable manner. It has been keenly desired, therefore, to develop a graft polymer of the aqueous emulsion type comprising finely divided particles.

There have been several proposals for production of graft polymers by aqueous emulsion polymerization according to a macromonomer process. For example, emulsion copolymerization of a polyisobutylene type macromonomer having a p-vinylphenyl group at one terminal thereof and styrene is reported by Joseph P. Kennedy et al. in *Polymer Bulletin*, No. 13, pp. 441-446 (1985). According to the report, the above-described macromonomer is dissolved in a styrene monomer, and the solution is emulsified in water with sodium nonylphenoxypolyethoxyethanol sulfate to prepare a finely divided aqueous emulsion having an average particle size of about 0.24 μm. The resulting aqueous emulsion is then polymerized in the presence of oil-soluble azobisisobutyronitrile as a polymerization initiator to obtain a graft polymer in a high yield.

The inventors of the present invention attempted variations on the process of Kennedy et al., replacing the polyisobutylene type macromonomer with a polyacrylic ester type macromonomer, a styrene/acrylonitrile copolymer type macromonomer, and other macromonomoers suitable as coating resins, etc. As a result, they encountered a large amount of coagula during production and failed to obtain a satisfactorily emulsified dispersion.

JP-A-62-64814 (the term "JP-A" as used herein means an "unexamined published Japanese patent application") discloses a process in which a macromonomer is dissolved in an organic solvent, e.g., toluene; an emulsifying agent is added thereto; a finely divided aqueous dispersion is prepared in the presence of water; a monomer copolymerizable with the macromonomer is added to the dispersion; and copolymerization is conducted in the presence of a radical polymerization initiator to prepare an aqueous emulsion of a graft polymer. According to this process, however, because the macromonomer forms micelles independently of the other copolymerizable monomer, polymerization among the macromonomer molecules or among the other copolymerizable monomer molecules proceeds predominantly over graft polymerization, resulting in poor production yield of the desired graft polymer.

SUMMARY OF THE INVENTION

An object of the present invention is to provide a process for producing an aqueous resin dispersion having a high content of a graft polymer with a reduced content of an unreacted macromonomer.

The inventors have conducted extensive investigations to solve the above-described problems associated with the conventional techniques. As a result, it has now been found that when a macromonomer is dissolved in a hydrophobic copolymerizable vinyl monomer together with an oil-soluble radical polymerization initiator, and the solution is emulsified and dispersed in an aqueous medium by using a specific emulsifying agent, the macromonomer and the copolymerizable vinyl monomer can easily be emulsified to form stable microfine micelles having an average particle diameter of not more than about 1 μm even with a small amount of an emulsifying agent, and the resulting monomer emulsion can be polymerized to produce a graft polymer in an extremely high yield. The present invention has been completed based on this finding.

Thus, the present invention relates to a process for producing an aqueous resin dispersion, which comprises dissolving a macromonomer having a radical polymerizable group at the terminal thereof and an oil-soluble radical polymerization initiator in a hydrophobic vinyl monomer copolymerizable with the macromonomer to form a solution, emulsifying the solution in an aqueous medium in the presence of an emulsifying agent selected from (A) an alkali sulfosuccinate anionic surfactant and (B) a surfactant comprising from 2 to 98% by weight of (i) an alkali sulfonate anionic surfactant other than (A) or (ii) an alkali sulfate anionic surfactant, and from 98 to 2% by weight of a nonionic surfactant having an HLB (hydrophilic-lipophilic balance) value of 10 or more, and copolymerizing the macromonomer and the vinyl monomer at an elevated temperature.

DETAILED DESCRIPTION OF THE INVENTION

The macromonomer which can be used in the present invention is a high-molecular weight monomer composed of a polymer portion (polymer skeleton) and a radical polymerizable group bonded to one terminal of the polymer portion and having a number average molecular weight of from about 1,000 to 100,000, and preferably from about 2,000 to 50,000.

If the number average molecular weight of the macromonomer is less than about 1,000, grafted branches of the resulting graft polymer are too short for physical properties inherent to graft polymers to be manifested. If it exceeds about 100,000, copolymerizability with other vinyl monomers becomes poor, reducing the graft polymer yield.

Examples of the radical polymerizable group in the macromonomer include an acryloyl group, a methacryloyl group, a styryl group, an allyl group, a vinylbenzyl group, a vinyl ether group, a vinylalkylsilyl group, a vinyl ketone group, and an isopropenyl group. Monomers which may constitute the polymer portion of the macromonomer include acrylic esters, and methacrylic esters (hereafter "acrylic" and "methacrylic" being correctively referred to as "(meth)acrylic"), e.g., methyl (meth)acrylate, ethyl (meth)acrylate, butyl (meth)acrylate, isobutyl (meth)acrylate, t-butyl (meth)acrylate, 2-ethylhexyl (meth)acrylate, lauryl (meth)acrylate, stearyl (meth)acrylate, behenyl (meth)acrylate, and cyclohexyl (meth)acrylate; hydroxyalkyl (meth)acrylates, e.g., 2-hydroxyethyl (meth)acrylate, hydroxypropyl (meth)acrylate, and hydroxybutyl (meth)acrylate; (meth)acrylamides, e.g., (meth)acryamide, N-methylolacrylamide, and diacetone acrylamide; fluorine-containing acrylates, e.g., and prefluorobutyl acrylate, perfluoropropyl acrylate, perfluorohexyl acrylate, perfluorooctyl acrylate; silicon-containing acrylate, e.g., acryloyloxypropyltrimethoxysilane; styrene and its derivatives, e.g., styrene, α-methylstyrene, and p-methylstyrene; nitrile-containing monomers, e.g., (meth)acrylonitrile, vinylidene cyanide, and α-cyanoethyl acrylate; vinyl esters, e.g., vinyl acetate and vinyl propionate; halogenated vinyl monomers, e.g., vinyl chloride, vinyl fluoride, vinylidene chloride, and vinylidene fluoride; olefin compounds, e.g., butadiene, isoprene, and isobutylene; polyalkylene glycol mono(meth)acrylates, e.g., polyethylene glycol mono(meth)acrylate and polypropylene glycol mono(meth)acrylate; vinylpyrrolidone; vinylpyridine; and maleic anhydride. These vinyl monomers may be used either alone or in combinations of two or more thereof.

The macromonomer can be prepared by various known processes, e.g., a process in which a monofunctional living polymer is formed by solution polymerization using, for example, an anionic polymerization initiator and, when a prescribed molecular weight is reached, the polymer is reacted with a stopper having a radical polymerizable group, e.g., a vinyl group (see JP-A-51-125186 (the term "JP-A" as used herein means an "unexamined published Japanese patent application"), and a process in which a radical polymerizable monomer is polymerized in the presence of a mercaptan radical chain transfer agent having a carboxyl group, etc. and the resulting polymer having a functional group (e.g., a carboxyl group) at the terminal thereof is reacted with glycidyl (meth)acrylate, etc. (see JP-B-43-11224 (the term "JP-B" as used herein means an "examined published Japanese patent application"). In addition, a group transfer polymerization process (see JP-A62-62801) and an iniferter polymerization process may also be used.

In the present invention, it is preferable to use a macromonomer comprising a polymer skeleton prepared by radical polymerization or anionic polymerization and having a (meth)acryloyl group having high radical polymerizability bonded to the terminal thereof.

It is essential in the present invention that the macromonomer first be as dissolved in a copolymerizable vinyl monomer together with an oil-soluble radical polymerization initiator hereinafter described to form a solution of these three components, which is then emulsified and dispersed in an aqueous medium. By this emulsification operation, there are formed emulsified fine particles, i.e., micelles, each containing therein the macromonomer, copolymerizable monomer(s), and polymerization initiator. The concentration of the polymerization initiator in individual micelles is easily controllable, and the macromonomer and copolymerizable vinyl monomer coexisting in individual micelles are readily copolymerized. Thus, a higher grafting efficiency can be attained as compared with the conventional emulsion polymerization techniques.

Solubility of the macromonomer and oil-soluble radical polymerization initiator in the vinyl monomer may be improved by using an appropriate amount of an organic solvent, e.g., toluene, xylene, methyl isobutyl ketone, and ethyl acetate.

The monomer to be copolymerized with the macromonomer is either a hydrophobic vinyl monomer which can be emulsified in an aqueous medium or a mixture of such vinyl monomers. In the latter case, the mixture may contain hydrophilic vinyl monomers in addition to hydrophobic vinyl monomers.

Examples of hydrophobic vinyl monomers which are copolymerizable with the macromonomer and are liquid at ambient temperature include (meth)acrylic esters, e.g., methyl methacrylate, ethyl (meth)acrylate, butyl (meth)acrylate, isobutyl (meth)acrylate, t-butyl (meth)acrylate, 2-ethylhexyl (meth)acrylate, and lauryl (meth)acrylate; fluorine-containing acrylates, e.g., perfluorobutyl acrylate, perfluoropropyl acrylate, perfluorohexyl acrylate, and perfluorooctyl acrylate; silicon-containing acrylates, e.g., acryloyloxypropyltrimethoxysilane; styrene and its derivatives, e.g., styrene, α-methylstyrene, and p-methylstyrene; (meth)acrylonitrile; and vinyl esters, e.g., vinyl acetate and vinyl propionate.

Other vinyl monomers which can be used together with the above-described hydrophobic liquid vinyl monomers include hydrophilic vinyl monomers, e.g., methyl acrylate, 2-hydroxyethyl (meth)acrylate, hydroxypropyl (meth)acrylate, (meth)acrylamide, N-methylol(meth)acrylamide, polyethylene glycol mono(meth)acrylate, polypropylene glycol mono(meth)acrylate, (meth)acrylic acid, vinylpyrrolidone, and vinylpyridine; polyfunctional vinyl monomers, e.g., divinylbenzene, diallyl phthalate, and diethylene glycol diacrylate; stearyl (meth)acrylate, behenyl (meth)acrylate, maleic anhydride, butadiene, isoprene, and vinylidene chloride.

The copolymerization ratio of macromonomer is 1 to 50% by weight, preferably 3 to 33% by weight, based on the total monomers. If the copolymerization ratio of the macromonomer exceeds 50% by weight, the polymerization system is apt to be gelled. The above-described hydrophilic vinyl monomer may be copolymerized in an amount of not more than 49% by weight, preferably not more than 30% by weight, based on the total monomers. Where a polyfunctional vinyl monomer is used as a part of the copolymerizable monomer, it is preferably used in an amount of up to 5% by weight, more preferably up to 3% by weight, based on the total monomers.

In emulsifying a monomer solution containing the macromonomer and an oil-soluble radical polymerization initiator dissolved in the copolymerizable monomer(s) in an aqueous medium to form microfine micelles, it is necessary to use an emulsifying agent selected from the surfactants (A) and (B) described below.

Emulsification can be effected by stirring a mixture comprising 100 parts by weight of a monomer mixture, from 0.3 to 5 parts by weight of an emulsifying agent, and from 10 to 200 parts by weight, preferably from 30 to 100 parts by weight, of water in a homo-mixer or by the action of ultrasonic waves.

The emulsification is preferably performed so that the micelles may have a particle size as small as possible. More specifically, a preferred average particle size of the micelles is not more than 5 μm, more preferably not more than 1 μm and most preferably not more than 0.5 μm. If the micelles have a particle size of 5 μm or more, the resulting resin dispersion would have a particle diameter exceeding 5 μm. Such a resin dispersion is poor in film-forming properties and is limited in application. For example, it is not suitable as a coating agent or an adhesive.

The smaller the amount of the emulsifying agent used, the better the physical properties, such as water resistance, of the resulting resin dispersion. A preferred amount of the emulsifying agent is from 0.3 to 3 parts by weight per 100 parts by weight of the monomer solution.

The resulting emulsion may be heated as is and polymerized. However, for ease in controlling heat generation during polymerization, it is preferable that the emulsion be added dropwise to a heated aqueous medium to conduct polymerization so as to obtain an aqueous resin dispersion having a solid content of from 20 to 70% by weight.

The polymerization temperature is selected from a range generally employed in emulsion polymerization, preferably of from 50° to 90° C. and more preferably 60° to 80° C.

Surfactant (A) is an alkali sulfosuccinate anionic surfactant. Specific examples of surfactant (A) are sodium di- 2-ethylhexylsulfosuccinate, sodium dioctylsulfosuccinate, sodium polycyclic phenylpolyethoxysulfosuccinate, sodium polyoxyethylene alkylallyl ether sulfosuccinate monoester, and sodium polyoxyethylene lauryl ether sulfosuccinate.

While surfactant (A) can be used alone to serve as an emulsifying agent, a combination of surfactant (A) and other surface active agents brings about further improved stability of the aqueous emulsion during polymerization. Surfactants which can be preferably combined with surfactant (A) include nonionic surfactants having an HLB value of 10 or more. Specific examples of such nonionic surfactants include those hereinafter enumerated as examples of the nonionic surfactant which is a component constituting surfactant (B). A preferred mixing weight ratio of surfactant (A) to the nonionic surfactant is 10/90 to 90/10 and preferably 10/90 to 40/60.

Surfactant (B) comprises (i) an alkali sulfonate type anionic surfactant other than surfactant (A) or an alkali sulfuric ester type anionic surfactant and (ii) a nonionic surfactant having an HLB value of 10 or more.

Specific examples of the alkali sulfonate type anionic surfactant other than surfactants (A) include alkylbenzenesulfonic acid alkali metal salts, e.g., sodium dodecylbenzenesulfonate, sodium alkylnaphthalenesulfonates, sodium alkyldiphenyl ether disulfonates, and alkali metal salts of a naphthalenesulfonic acid-formalin condensate.

Specific examples of the alkali sulfuric ester anionic surfactant include alkali alkylsulfates, e.g., sodium lauryl sulfate and sodium stearyl sulfate, and sodium polyoxyethylene alkylene ether sulfates, e.g., sodium polyoxyethylene lauryl ether sulfate and sodium polyoxyethylene octylphenyl ether sulfate.

Specific examples of the nonionic surfactant having an HLB value of 10 or more which is included in surfactnat (B) include polyoxyethylene nonylphenyl ethers, e.g., Emulgen 910, Emulgen 930 and Emulgen 938 (products of Kao Corporation), Newcol 563 and Newcol 566 (products of Nippon Nyukazai Co., Ltd.), Nonal 210 (a product of Toho Chemical Industry Co., Ltd.); polyoxyethylene octyl phenyl ethers, e.g., Emulgen 810 and Emulgen 840S (products of Kao Corporation), Newcol 860 and Newcol 804 (products of Nippon Nyukazai Co., Ltd.), and Nonal 210 (a product of Toho Chemical Industry Co., Ltd.); and polyoxyethylene sorbitan monoalkylates, polyethylene glycol distearate and polyoxyethylene cetyl ether, e.g., Reodol TW-L20 and Reodol TW-S120 (products of Kao Corporation), Newcol 25 and Newcol 65 (products of Nippon Nyukazai Co., Ltd.), and Sorbon T-20 and Sorbon T-60 (products of Toho Chemical Industry Co., Ltd.).

If a nonionic surfactant having an HLB value of less than 10 is used as a component of surfactant (B), the resulting aqueous emulsion has poor stability during polymerization and cannot be smoothly polymerized.

The weight ratio of anionic surface active agent to nonionic surfactant in surfactant (B) is 2/98 to 98/2 and preferably 5/95 to 50/50.

The emulsifying agent to be used may further contain other surfactants in addition to those described above.

The polymerization initiator which can be used in the present invention is an oil-soluble radical polymerization initiator having a water solubility of not more than 10% by weight, preferably not more than 3% by weight, more preferably not more than 1% by weight, at 20° C.. Examples of preferred polymerization initiators include azo type initiators, e.g., 2,2'-azobisisobutyronitrile, 2,2'-azobis-2,4dimethylvaleronitrile, 2,2'-azobis-2-cyclopropylpropionitrile, 2,2'-azobis-2-methylbutyronitrile, 1-azobis-1cyclohexanecarbonitrile, dimethyl-2,2'-azobisisobutyrate, and 4,4'-azobis-4-cyanovaleric acid; and organic peroxides, e.g., lauryl peroxide, benzoyl peroxide, dicumyl peroxide, cyclohexanone peroxide, di-n-propyl peroxydicarbonate, and t-butyl peroxypivalate.

The polymerization initiator is preferably used in an amount of from 0.1 to 10% by weight, and more preferably from 0.5 to 5% by weight, based on the total weight of the macromonomer and the copolymerizable monomer(s). If the amount of the polymerization initiator is less than 0.1% by weight, emulsion polymerization hardly proceeds, and the macromonomer and copolymerizable monomer(s) tend to remain unreacted. If it exceeds 10% by weight, the formed graft polymer has a reduced molecular weight, and use of the resulting aqueous dispersion is limited.

As stated above, the polymerization initiator should be mixed with the macromonomer and copolymerizable monomer to form a solution of these three components, which is then dispersed and emulsified in an aqueous medium to form a polymerization system. If the initiator is added to the polymerization system otherwise, for example, independently of the monomers, the resulting aqueous resin dispersion contains a large quantity of unreacted macromonomer and unreacted copolymerizable monomer.

According to the present invention, since a macromonomer can be stably emulsified in the form of fine micelles by using a small amount of an emulsifying agent, the resulting aqueous resin dispersion not only has a small content of the emulsifying agent but an increased proportion of the produced graft polymer with a reduced content of unreacted macromonomer.

Therefore, the aqueous resin dispersion obtained by the process of the present invention is suited for a wide range of applications as, for example, pressure-sensitive adhesives, other adhesives, coatings, coating additives, dispersibility modifiers for pigments and fillers, antistatic agents, resin modifiers, etc.

In particular, pressure-sensitive adhesives are essentially required to have tackiness (usually called "tack"), cohesion, and adhesion to an adherend, but it has been difficult to obtain a pressure-sensitive adhesive satisfying all of these requirements. For example, pressure-sensitive adhesives having high tack and adhesion often lack cohesive force, and those having high cohesive force tend to lack tack or adhesion. In this connection, the aqueous resin dispersion according to the present invention provides a pressure-sensitive adhesive free from such a disadvantage. In a preferred embodiment of the present invention, there is provided an aqueous resin dispersion exhibiting sufficient tack and excellent cohesion, which is obtained by emulsifying a macromonomer comprising a polymer skeleton having a glass transition temperature (Tg) of 30° C. or higher with a radical polymerizable group bonded to one terminal thereof, an alkyl acrylate having from 4 to 12 carbon atoms as a copolymerizable vinyl monomer, and a crosslinking polymer containing a radical polymerizable group at both terminals thereof and having a number average molecular weight of about 1000 or more in an aqueous medium in the presence of surfactant (A) or (B) and subjecting the emulsion to radical polymerization.

The above-described embodiment of the present invention will be explained below in more detail.

The macromonomer which can be used in the embodiment comprises a polymer skeleton having a Tg of 30° C. or higher, preferably 50° C. or higher, with a radical polymerizable group bonded to one terminal thereof. If the polymer skeleton has a Tg of less than 30° C., the resulting pressure-sensitive adhesive has reduced cohesion.

Examples of the radical polymerizable group at the terminal of the polymer skeleton include a (meth)acryloyl group, a styryl group, an allyl group, and a vinyl ether group.

Monomers constituting the polymer skeleton of the macromonomer preferably include those capable of providing homopolymers having a Tg of 30° C. or higher, e.g., methyl methacrylate, ethyl methacrylate, isobutyl methacrylate, t-butyl methacrylate, cyclohexyl methacrylate, styrene, α-methyl styrene, and (meth)acrylonitrile; and monomers which are copolymerizable with the above-enumerated monomers, e.g., methyl acrylate, ethyl acrylate, butyl acrylate, 2-ethylhexyl acrylate, (meth)acrylic acid, 2-hydroxyethyl (meth)acrylate, N-methylolacrylamide,(meth)acrylamide,perfluoroalkylacrylates, acryloyloxypropyltrimethoxysilane, vinyl acetate, and maleic anhydride.

The alkyl acrylate having from 4 to 12 carbon atoms in the alkyl moiety thereof which can be used as a vinyl monomer copolymerizable with the macromonomer includes butyl acrylate, isobutyl acrylate, t-butyl acrylate, hexyl acrylate, cyclohexyl acrylate, octyl acrylate, 2-ethylhexyl acrylate, nonyl acrylate, decanyl acrylate, and dodecanyl acrylate. These copolymerizable vinyl monomers may be used either alone or in combinations of two or more thereof.

The above-mentioned alkyl acrylate is copolymerized with the macromonomer and a crosslinking polymer hereinafter described to form a main polymer chain of a graft copolymer, exhibiting physical properties required for pressure-sensitive adhesives.

The alkyl acrylate is preferably used in such an amount that the resulting graft copolymer contains a copolymer unit derived from the alkyl acrylate in a proportion of from 50 to 95% by weight based on the total monomer units.

Branch polymer portions of the graft copolymer are constituted by the macromonomer. The proportion of the macromonomer unit in the graft copolymer preferably ranges from 1 to 30% by weight, and more preferably from 5 to 30% by weight. Macromonomers are of lower polymerizability as compared with low-molecular weight monomers such as alkyl acrylates, usually having a polymerization conversion of from about 60 to 75%. Therefore, it is necessary to use the macromonomer in an amount larger than that corresponding to the proportion of the macromonomer unit in the resulting graft copolymer.

If desired, the above-mentioned monomers may be used in combination with other radical polymerizable monomers. Examples of such monomers are methyl acrylate, ethyl acrylate, propyl acrylate, lauryl acrylate, stearyl acrylate, methyl methacrylate, ethyl methacrylate, propyl methacrylate, butyl methacrylate, octyl methacrylate, nonyl methacrylate, 2-ethylhexyl methacrylate, (meth)acrylic acid, itaconic acid, 2-hydroxyethyl (meth)acrylate, N-methylolacrylamide, (meth)acrylamide, polyethylene glycol mono(meth)acrylate, vinylpyrrolidone, glycidyl (meth)acrylate, allyl glycidyl ether, vinyl acetate, and maleic anhydride.

The graft copolymer may contain these other monomers in a proportion of up to 30% by weight based on the total monomer units.

Monomers which constitute a crosslinking polymer having a radical polymerizable group at both terminals thereof and having a number average molecular weight of about 1000 or more include those enumerated above with respect to monomers constituting the macromonomer skeleton. Examples of the radical polymerizable group bonded to both terminals of the crosslinking polymer include a (meth)acryloyl group, a styryl group, an allyl group, and a vinyl ether group, with a (meth)acryloyl group being preferred.

The crosslinking polymer can be obtained as a by-product in the production of macromonomers according to a radical polymerization process as disclosed in JP-B-43-11224 by properly selecting the kinds and amounts of carboxy group-containing polymerization initiators or carboxy group-containing chain transfer agents.

For example, a monomer, e.g., styrene or methyl methacrylate, is polymerized in the presence of 10 parts by weight, per 100 parts by weight of the monomer, of a polymerization initiator containing a carboxyl group, e.g., 4,4'-azobis-4-cyanovaleric acid, and the resulting polymer containing a carboxyl group at the terminal thereof and having a number average molecular weight of 5,000 is then reacted with glycidyl methacrylate, etc. to thereby obtain a mixture containing from 70 to 80% by weight of a macromonomer containing a methacryloyl group at one terminal thereof and from 20 to 30% by weight of a polymer containing a methacryloyl group at both terminals thereof. The thus obtained mixture of the macromonomer and crosslinking polymer may be used as it is in the subsequent copolymerization with other radical polymerizable monomer(s).

The crosslinking polymer is preferably used in an amount of from about 1 to 20 parts by weight, and more preferably from about 2 to 10 parts by weight, per 100 parts by weight of the macromonomer.

By the use of the crosslinking polymer together with the macromonomer at the above-specified ratio, a part of the resulting graft copolymer is made insoluble in, e.g., tetrahydrofuran. In this embodiment of the present invention, it is desirable that at least about 10% by weight, and particularly from about 15 to 50% by weight, of the graft copolymer be insoluble in tetrahydrofuran.

Having a structure crosslinked by the crosslinking polymer having a long molecular chain, that is, a number average molecular weight of about 1000 or more, the resulting graft copolymer maintains sufficient tack as required for pressure-sensitive adhesives while exhibiting high cohesion. If the molecular weight of the crosslinking polymer is less than about 1000, the resulting graft copolymer has reduced tack and is no longer suitable as a pressure-sensitive adhesive.

The above-described polymerizable components are emulsified in an aqueous medium in the presence of surfactant (A) or (B) and then polymerized.

The aforesaid polymerization initiators can be used in this embodiment. The polymerization initiator is suitably used in an amount of from 0.5 to 5 parts by weight per 100 parts by weight of the total monomers.

The resulting emulsion may be heated to about 50° to 90° C. as it is and polymerized. However, for ease in controlling heat generation during polymerization, it is preferable that the emulsion be added dropwise to a heated aqueous medium to conduct polymerization so as to obtain an aqueous resin dispersion having a solid content of from 20 to 70% by weight.

The thus obtained pressure-sensitive adhesive comprises a graft polymer composed of a main polymer component which is soft and rich in tack with branches of a relatively hard polymer component. The graft copolymer also has a moderately crosslinked structure. Hence, the pressure-sensitive adhesive exhibits excellent characteristics which could not be expected from generally known knowledge about conventional adhesives comprising acrylate copolymers obtained by random copolymerization. The pressure-sensitive adhesive of the present invention possesses very satisfactory cohesion and is also excellent in heat resistance.

The pressure-sensitive adhesive of the present invention is useful on general adhesive labels, tapes or sheets, surface protective sheets, re-release sheets and, in addition, in adhesive products which are required to have high strength, for example, those for use in automobiles.

The present invention is now illustrated in greater detail with reference to Examples, but it should be understood that the present invention is not deemed to be limited thereto. All the percents, parts, and ratios are by weight unless otherwise indicated.

EXAMPLE 1

In a mixed solution of 160 parts of methyl methacrylate (hereinafter abbreviated as MMA) and 40 parts of butyl acrylate (hereinafter abbreviated as BA) were dissolved 50 parts of a styrene/acrylonitrile copolymer macromonomer having a methacryloyl group at one terminal thereof ("AN-6" produced by Toagosei Chemical Industry Co., Ltd.; number average molecular weight $M_n$: about 6,000) and 3 parts of 2,2'-azobisisobutyronitrile (hereinafter abbreviated as AIBN). The resulting solution was emulsified in 90 parts of deionized water in a homo-mixer in the presence of 5 parts (corresponding to 2 parts per 100 parts of the total monomers) of sodium di-2-ethylhexylsulfosuccinate as an emulsifying agent to prepare an aqueous emulsion (hereinafter referred to as pre-emulsion).

The particle size of the resulting pre-emulsion was measured by means of a laser diffraction particle size distribution measuring apparatus ("LA-500" manufactured by Horiba Seisakusho). As a result, the pre-emulsion was found to have an average particle diameter of 0.44 μm. The pre-emulsion was stable without phase separation when allowed to stand over 1 day.

The whole amount of the pre-emulsion (348 parts) was subjected to polymerization as follows.

In a 1 l-volume flask equipped with a stirrer, a thermometer and a cooler were charged 250 parts of deionized water and 1.5 parts of the pre-emulsion, and the inner temperature was kept at 80°±1° C. while bubbling nitrogen through the mixture. Then, the rest of the pre-emulsion (346.5 parts) was added thereto dropwise over 4 hours while stirring. After the addition, the stirring was continued for an additional period of 2 hours to complete polymerization. During the polymerization reaction, the system was kept stable with neither phase separation nor blocking, except that a slight agglomerate deposited on the inner wall of the flask.

When the resulting emulsion polymer was filtered through a net of 200 mesh, the amount of coagula was not more than 0.1 part. Gas chromatography of the polymer revealed that the total amount of unreacted monomers was not more than 1%. Gel-permeation chromatography (GPC) revealed that the polymer had a number average molecular weight $M_n$ of 108,000 and a weight average molecular weight $M_w$ of 1,057,000 on polystyrene conversion, and the conversion of the macromonomer was found to be 66%. The polymer had an average particle size of 0.42 μm with a narrow size distribution. The terminology "conversion of macromonomer" as used herein means the ratio of the macromonomer which has undergone polymerization to the macromonomer charged. The conversion of macromonomer can be determined by GPC.

EXAMPLES 2 TO 6

An aqueous resin dispersion was prepared in the same manner as in Example 1, except for using each of the macromonomers shown in Table 1 below. The results obtained are also shown in Table 1.

tained are also shown in Table 2. All the pre-emulsions prepared showed stability over one day.

TABLE 2

| Example No. | Emulsifying Agent Kind | Emulsifying Agent Amount (part) | Average Particle Size of Pre-Emulsion (μm) | Stability During Polymerization | Amount of Coagula (part) | Average Particle Size of Resin Dispersion (μm) |
|---|---|---|---|---|---|---|
| Example 7 | A | 2 | 0.48 | satisfactory | 0.1 | 0.42 |
| Example 8 | D | 5 | 0.40 | satisfactory | 0.1 | 0.42 |
| Comparative Example 1 | B | 5 | 1.60 | slightly instable | 1.9 | 1.99 |
| Comparative Example 2 | C | 5 | 2.22 | slightly instable | 2.2 | 2.05 |
| Comparative Example 3 | E | 5 | 1.25 | slightly instable | 1.3 | 1.03 |
| Comparative Example 4 | F | 5 | 2.53 | A large amount of coagula were produced after 50 minutes from the start of polymerization so that polymerization was not completed. | | |

Note:
A: Sodium di-2-ethylhexylsulfosuccinate
B: Sodium dodecylbenzenesulfonate
C: Sodium stearyl sulfate
D: Sodium polyoxyethylene lauryl ether sulfosuccinate monoester
E: Sodium polyoxyethylene laurylphenyl ether sulfate
F: Sodium oleate The amount of coagula shown in Table 1 is the amount of coagula produced per 250 parts of the total monomer mixture charged comprising the macromonomer and copolymerizable monomer(s). The amount of coagula shown in subsequent Tables and Examples is calculated on the same basis.

EXAMPLES 9 to 12

An aqueous resin dispersion was prepared in the same manner as in Example 1, except for replacing sodium di-2-ethylhexylsulfosuccinate with 2 parts of the anionic surfactant shown in Table 3 below and 4 parts of a polyoxyethylene nonylphenyl ether type nonionic surfactant having a varied HLB value as shown in Table 3. The results obtained are also shown in Table 3. In each case, the pre-emulsion prepared and the polymerization system showed satisfactory stability.

TABLE 1

| Example No. | Macro-monomer | Average Particle Size of Pre-emulsion (μm) | Amount of Coagula (part) | Copolymerizable Monomer Conversion (%) | Macromonomer Conversion (%) | Average Particle Size (μm) | Average Molecular Weight ($\times 10^4$) Mn | Average Molecular Weight ($\times 10^4$) Mw |
|---|---|---|---|---|---|---|---|---|
| 2 | AS-6[1] | 0.40 | 0.2 | 99 | 73 | 0.38 | 17.7 | 180.6 |
| 3 | AB-2[2] | 0.36 | ≦0.1 | ≧99 | 75 | 0.39 | 15.2 | 166.0 |
| 4 | AB-20[3] | 0.43 | ≦0.1 | 98 | 69 | 0.40 | 23.0 | 192.5 |
| 5 | AA-6[4] | 0.37 | 0.2 | ≧99 | 69 | 0.35 | 16.8 | 182.2 |
| 6 | 13K-RC[5] | 0.49 | 0.4 | 99 | 71 | 0.46 | 24.3 | 160.9 |

Note:
[1] Methacryloyl-terminated (one end) polystyrene macromonomer produced by Toagosei Chemical Industry Co., Ltd.; Mn: ca 6,000
[2] Methacryloyl-terminated (one end) polybutyl acrylate macromonomer produced by Toagosei Chemical Industry Co., Ltd.; Mn: ca. 2,000
[3] Methacryloyl-terminated (one end) polybutyl acrylate macromonomer produced by Toagosei Chemical Industry Co., Ltd.; Mn: ca. 20,000
[4] Methacryloyl-terminated (one end) polymethyl methacrylate macromonomer produced by Toagosei Chemical Industry Co., Ltd.; Mn: ca 6,000
[5] Methacryloyl-terminated (one end) polystyrene macromonomer "MACROMER 13K-RC" produced by Sartomer Co. according to an anionic polymerization process; Mn: 13,000

EXAMPLES 7 AND 8 AND COMPARATIVE EXAMPLES 1 TO 4

An aqueous resin dispersion was prepared in the same manner as in Example 1, except for using each of the emulsifying agents shown on Table 2. The results ob-

TABLE 3

| Example No. | Anionic Surfactant | HLB of Nonionic Surfactant | Average Particle Size of Pre-Emulsion (μm) | Amount of Coagula (part) | Average Particle Size of Resin Dispersion (μm) | Average Mol. Wt. ($\times 10^4$) Mn | Average Mol. Wt. ($\times 10^4$) Mw |
|---|---|---|---|---|---|---|---|
| 9 | A | 13.5 | 0.31 | ≦0.1 | 0.33 | 15.5 | 120 |
| 10 | B | 17.2 | 0.36 | 0.2 | 0.35 | 12.7 | 108 |
| 11 | C | 18.9 | 0.34 | 0.2 | 0.38 | 16.6 | 118 |
| 12 | D | 15.5 | 0.49 | 0.1 | 0.53 | 15.3 | 121 |

Note: A, B, and C indicate the same surfactants as shown in the footnote of Table 2.

EXAMPLE 13 AND COMPARATIVE EXAMPLE 5

AN-6 as a macromonomer and a copolymerizable monomer mixture of MMA, BA and methacrylic acid (hereinafter abbreviated as MAA) were copolymerized at an AN-6/MMA/BA/MAA copolymerization ratio of 100/100/45/5 (by part) according to the following procedure.

Polymerization was conducted in the same manner as in Example 1, except for using 3 parts of sodium nonylphenoxypolyethoxyethanol sulfate as used by Joseph P. Kennedy et al. as an emulsifying agent (Comparative Example 5).

On the other hand, polymerization was conducted in the same manner as described above, except for using 3 parts of the above-described sodium nonylphenoxypolyethoxyethanol sulfate in combination with 4 parts of polyoxyethylene nonylphenyl ether having an HLB value of 18.5 (Example 13).

Properties of the resulting aqueous resin dispersions are shown in Table 4 below.

TABLE 4

|  | Example 13 | Comparative Example 5 |
| --- | --- | --- |
| Amount of Coagula (part) | 0.1 | 0.4 |
| Macromonomer Conversion (%) | 65 | 41 |
| Average Particle Size of Resin Dispersion (μm) | 0.49 | 1.1 |

EXAMPLE 14

An aqueous resin dispersion was prepared in the same manner as in Example 1, except for using 1.5% of lauroyl peroxide as a polymerization initiator. The resulting aqueous resin dispersion had the following properties.

Amount of Coagula (part): ≦0.1
Macromonomer Conversion (%): 73
Average Particle Size of Resin Dispersion (μm): 0.36
Mn: 255,000
Mw: 2,108,000

COMPARATIVE EXAMPLE 6

An aqueous resin dispersion was prepared in the same manner as in Example 1, except for using 3 parts of sodium nonylphenoxypolyethoxyethanol sulfate as used by Joseph P. Kennedy et al. Properties of the resulting dispersion are shown in Table 5 below.

EXAMPLE 15

An aqueous resin dispersion was prepared in the same manner as in Example 1, except for using 3 parts of sodium nonylphenoxypolyethoxyethanol sulfate in combination with 4 parts of polyoxyethylene nonylphenyl ether having an HLB value of 18.5. Properties of the resulting dispersion are shown in Table 5 below.

TABLE 5

|  | Comparative Example 6 | Example 15 |
| --- | --- | --- |
| Amount of Coagula (part) | 1.4 | 0.4 |
| Macromonomer Conversion (%) | 53 | 65 |
| Average Particle Size of Resin Dispersion (μm) | 0.92 | 0.48 |

REFERENCE EXAMPLE 1

In a glass flask equipped with a stirrer, a reflux condenser, two dropping funnels, a thermometer and an inlet for gas blowing were charged 30 parts of MMA, 1.08 part of 3-mercaptopropionic acid, and 30 parts of toluene. In one of the dropping funnels was placed 70 parts of MMA, and in the other dropping funnel were placed 0.1 part of AIBN and 30 parts of toluene. Nitrogen was blown into the flask, and the content in each dropping funnel was added to the mixture dropwise over 3 hours while keeping the mixture at an elevated temperature of 90° C. Then, 0.5 part of AIBN dissolved in toluene was added thereto dropwise over 2 hours to complete polymerization. The heating was further continued for 2 hours to decompose AIBN to obtain an MMA polymer having a carboxyl group at the terminal thereof.

To the resulting toluene solution of the MMA polymer were added 0.04 part of hydroquinone monomethyl ether as a polymerization inhibitor, 1.75 part of glycidyl methacrylate, and 1.0 part of tetrabutylammonium bromide, and the mixture was allowed to react at 90° C. for 5 hours while blowing air to produce a macromonomer.

The resulting macromonomer had an Mn of 9,500 and an Mw of 19,200. The macromonomer contained 8% of the MMA polymer having a methacryloyl group at both terminals thereof.

Fifty parts of the resulting macromonomer containing 8% of the methacryloyl-terminated (both ends) MMA polymer, i.e., a crosslinking polymer, was mixed with 100 parts of 2-ethylhexyl acrylate, 150 parts of BA, 4.5 parts of MAA, and 3 parts of AIBN to prepare a uniform solution, and the solution was emulsified in 100 parts of deionized water in a homo-mixer using 5 parts of sodium di-2-ethylsulfosuccinate as an emulsifying agent.

The resulting pre-emulsion was found to comprise micelles having an average particle size of 0.68 μm as measured by a particle size distribution measuring apparatus "LA-500" manufactured by Horiba Seisakusho.

In a 1 l-volume flask equipped with a stirrer, a thermometer and a cooler were charged 200 parts of deionized water and a 1.5 part aliquot of the above-prepared pre-emulsion, and the inner temperature was raised to 80° C. while blowing nitrogen. The rest of the pre-emulsion was added thereto dropwise over 4 hours with stirring, and, after the addition, the polymerization reaction was continued for 2 hours. The emulsion polymerization proceeded stably with neither separation of agglomerates or blocking, except that a slight agglomerate deposited on the inner wall of the flask.

The resulting emulsion polymer was filtered through a net of 200 mesh and it was found that the content of coagula was 0.2%.

The polymer had an average particle size of 0.63 μm and a tetrahydrofuran-insoluble content of 30%.

To the emulsion polymer was added ASE-60 (polyacrylate thickener, produced by Japan Acrylic Chemical Co., Ltd.), and the pH was adjusted to 6.8 with aqueous ammonia. The resulting thickened aqueous resin was coated on a 50 μm thick polyethylene terephthalate film with a doctor blade and dried at 110° C. for 2 minutes to obtain an adhesive film having a 25 μm thick pressure-sensitive adhesive layer.

The resulting adhesive film was evaluated in terms of tack, adhesive strength, and retention of adhesion according to the following test methods. The results obtained are as follows.

Tack: 6
Adhesive Strength: 1300 g/in
Retention of Adhesion: 180 min with no slide 1) Tack Tack was measured according to J. Dow method (a so-called ball tack method) at 25°±1° C. and 65±1% RH.

2) Adhesive Strength

The adhesive film was cut to a width of 25 mm and adhered to a stainless steel plate by one stroke of a 2 kg rubber roller. Adhesive strength was measured by 180° peel test as specified in JIS Z 0273 (rate of pulling: 300 mm/min).

3) Retention of Adhesion

The adhesive film was adhered to a stainless steel plate over an area of 25 mm×25 mm. A load of 1 kg was fixed at 40° C., and the time until the load fell was measured.

REFERENCE EXAMPLE 2

A styrene/acrylonitrile copolymer macromonomer having an Mn of 6,000 and containing a methacryloyl group at the terminal thereof was subjected to emulsion polymerization. The macromonomer contained 6% of a styrene/acrylonitrile copolymer having a methacryloyl group at both terminals.

Forty-five parts of the macromonomer were mixed with 250 parts of BA, 4.5 parts of MAA, and 3 parts of AIBN to prepare a uniform solution, and emulsion polymerization was conducted in the same manner as in Reference Example 1.

The resulting emulsion polymer was filtered through a net of 200 mesh and it was found that the content of coagula was 0.1% or less.

The polymer had an average particle size of 0.55 μm and a tetrahydrofuran-insoluble content of 33%.

To the emulsion polymer was added ASE-60 produced by Japan Acrylic Chemical Co., Ltd., and this mixture was further processed in the same manner as in Reference Example 1 to obtain an adhesive film.

The resulting adhesive film was evaluated in the same manner as in Reference Example 1 to obtain the following results:

Tack: 6
Adhesive Strength: 1120 g/in
Retention of Adhesion: 180 min with no slide

COMPARATIVE REFERENCE EXAMPLE 1

A copolymer comprising 100 parts of 2-ethylhexyl acrylate, 150 parts of BA, and 4.5 parts of MAA was obtained as an emulsion polymer under the same conditions as in Reference Example 1, except for using no macromonomer.

An adhesive film was prepared by using an adhesive obtained by thickening the resulting emulsion polymer in the same manner as in Reference Example 1, and the resulting adhesive film was evaluated to obtain the following results:

Tack: 12
Adhesive Strength: 1100 g/in
Retention of Adhesion: 45 min

While the invention has been described in detail and with reference to specific embodiments thereof, it will be apparent to one skilled in the art that various changes and modifications can be made therein without departing from the spirit and scope thereof.

What is claimed is:

1. A process for producing an aqueous resin dispersion, which comprises dissolving a macromonomer having a radical polymerizable group at the terminal thereof and an oil-soluble radical polymerization initiator in a hydrophobic vinyl monomer copolymerizable with said macromonomer to form a solution, subsequently emulsifying the solution in an aqueous medium in the presence of an emulsifying agent selected from either (A) an alkali sulfosuccinate anionic surfactant or (B) a surfactant comprising, (i) from 2 to 98% by weight of an alkali sulfonate anionic surfactant other than (A) or an alkali sulfuric ester anionic surfactant, and (ii) from 98 to 2% by weight of a nonionic surfactant having an HLB value of 10 or more, and copolymerizing the macromonomer and the vinyl monomer at an elevated temperature.

2. A process as claimed in claim 1, wherein said macromonomer has a number average molecular weight of from about 1,000 to 100,000.

3. A process as claimed in claim 1, wherein said radical polymerizable group at the terminal of the macromonomer is an acryloyl group or a methacryloyl group.

4. A process as claimed in claim 1, wherein said oil-soluble radical polymerization initiator has a water-solubility of not more than 10% by weight at 20° C.

5. A process as claimed on claim 1, wherein said surfactant (A) is combined with from 10 to 90% by weight of a nonionic surfactant having an HLB value of 10 or more based on the total amount of surfactant (A) and the nonionic surfactant.

6. A process as claimed in claim 1, wherein said emulsifying is carried out to form micelles having an average particle size of not more than 5 μm.

7. A process for producing an aqueous resin dispersion, which comprises:

dissolving a macromonomer that comprises a polymer skeleton having a glass transition temperature of 30° C. or higher and having a radical polymerizable group bonded to one terminal thereof, a cross-linking polymer having a number average molecular weight of about 1000 or more and containing a radical polymerizable group at both terminals thereof, and an oil-soluble radical polymerization initiator in an alkyl moiety thereof to form a solution;

subsequently emulsifying the solution in an aqueous medium in the presence of an emulsifying agent selected from either (A) an alkali sulfosuccinate anionic surfactant or (B) a surfactant comprising (i) from 2 to 98% by weight of an alkali sulfonate anionic sufactant other than (A) or an alkali sulfuric ester anionic surfacant, and (ii) from 98 to 2% by weight of a nonionic surfactant having an HLB value of 10 or more; and then copolymerizing the macromonomer, the cross-linking polymer and the alkyl acrylate at an elevated temperature.

* * * * *